INVENTOR.
Martin Th. Relling
Theodore A. Zsamboky
BY Donald G. Dalton
THEIR ATTORNEY Dec. 27, 1949 M. TH. RELLING ET AL 2,492,924
REMOVAL OF CINDER FROM METALLURGICAL FURNACES, ETC
Filed April 26, 1946 3 Sheets-Sheet 2

INVENTOR.
Martin Th. Relling
Theodore A. Zsamboky
BY Donald G. Dalton
THEIR ATTORNEY Dec. 27, 1949   M. TH. RELLING ET AL   2,492,924
REMOVAL OF CINDER FROM METALLURGICAL FURNACES, ETC
Filed April 26, 1946   3 Sheets-Sheet 3
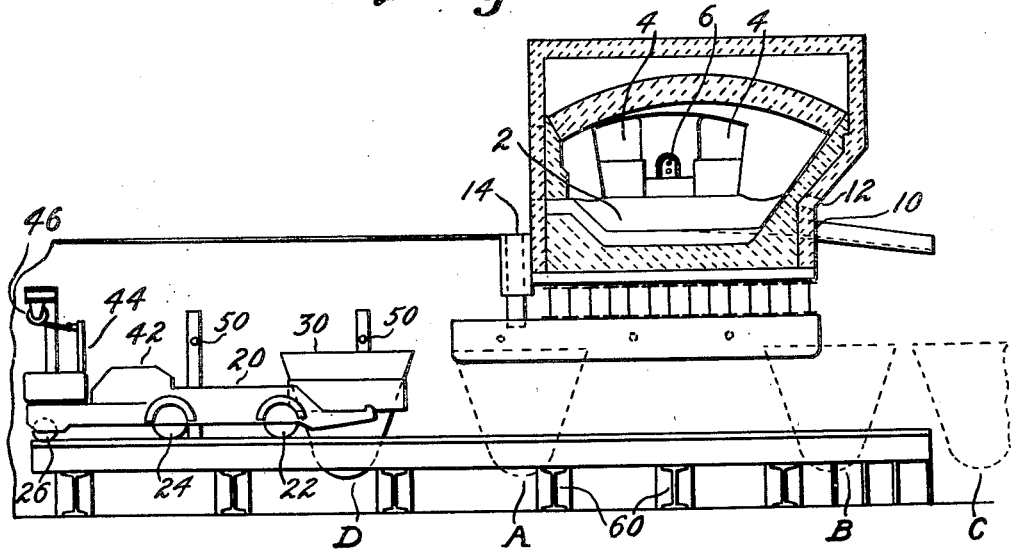
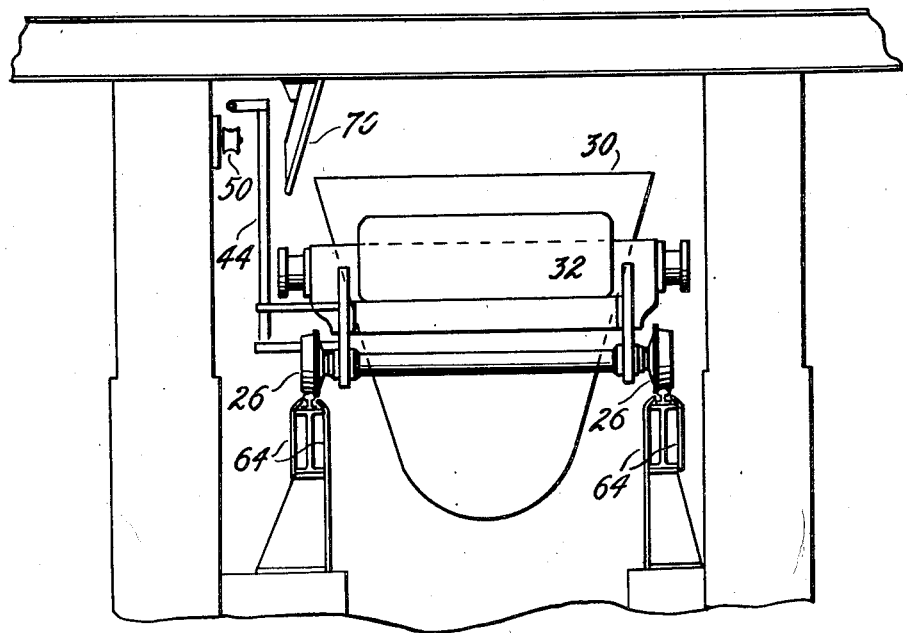
INVENTOR.
Martin Th. Relling
Theodore A. Zsamboky
BY Donald G. Dalton
THEIR ATTORNEY Patented Dec. 27, 1949

2,492,924

UNITED STATES PATENT OFFICE 2,492,924

REMOVAL OF CINDER FROM METALLURGICAL FURNACES, ETC.

Martin Th. Relling, Homestead Park, and Theodore A. Zsamboky, Pittsburgh, Pa., assignors to Carnegie-Illinois Steel Corporation, a corporation of New Jersey Application April 26, 1946, Serial No. 665,266

7 Claims. (Cl. 263—45)

This invention relates to the removal of cinder from metallurgical furnaces, and particularly to open hearth furnaces of the pan-bottom type using the well known front-flush cinder removal system, although not limited thereto.

In open hearth furnaces, the flush or run-off cinder is produced shortly after the hot metal is introduced into the furnace. This cinder or slag is drawn off at the cinder hole in the back (or tapping side) of the furnace, between the taphole and the end of the bath of molten metal, and at a height that precludes the possibility of molten metal running out with the cinder. This cinder runs into a cast iron or steel runner and from it into a cinder pot. On more modern, and usually larger open hearth furnaces, a pan-bottom is frequently employed together with means for removing cinder in the form of what is known as a front-flush system. With this front-flush system, the cinder runs over the sill plate in one of the doors in the front (or charging side) of the furnace into a cinder pot located under the charging floor. The cinder pot, carried on a buggy, is then hauled underneath the furnace from front to back and out into the furnace pit side at the back of the furnace, where it can be handled by a ladle crane.

When operating an open hearth furnace of the type described (i. e. pan-bottom type with a front-flush cinder removal system), a stationary cinder pot cannot be used because the cinder pot must be transferred from front to back, underneath the furnace and into the furnace pit area where it can be picked up by the ladle crane.

One of the most difficult and costly features of the operation of an open hearth furnace of the type described is the handling of the cinder from the front-flush and from the drip. It has heretofore been proposed to install beneath such open hearth furnaces a cable-operated 4-wheel car, carrying the cinder pot and running on steel rails or tracks of standard gauge, from the front to the back of the furnace at the lower level. Activation was provided by a motor-driven drag-out at the front of the furnace, the same operating a cable through a slotted steel pipe at one side of the furnace. Sheaves and take-up at the ends of the drag-out system completed the cable circuit. An arm attached to the side of the car, connected with the cable through the slot in the pipe. Control was effected through push buttons on a control panel on the lower level of the open hearth furnace, or by a reversing master switch located on the upper level at the tapping side of the said furnace. The tracks on which the car rode were clipped to the top flanges of longitudinal steel beam ties, encased in concrete both sides and bottom, at ground elevation.

In operation this installation proved inadequate, since frequently the cinder spilled over the sides of the steel ladle during furnace tapping, or over the sides of the cinder pot during the period of front-flush or the period of drip. A bad leaking tapping spout joint would also contribute to the overflow, thereby spilling the cinder over the car and track rails, and often to such an extent that it flowed up around the journals and wheels of the car or carriage for the cinder pot. Movement of the carriage under such conditions is impossible since the cable and pull arm will break. Quite frequently, the heat ruined the spring of the carriage and "froze" its bearings.

Removal of the spilled cinder, when solid, constituted quite a problem since it had to be dug out with a bulldozer, with resultant damage to tracks. Frequent repair and replacements of these tracks, repairing damage to the carriage due to extremely bad spilling of molten metal or cinder, and the moving of the cinder pot by emergency measures, all involved additional expense both in labor and material. A further source of trouble was the connecting arm by which the cable pulled the carriage. In operation, this arm frequently pulled off the carriage very readily, and the cable was subject to frequent breakage; so that eventually, the carriage would have to be moved back and forth on the track by means of a bulldozer. This temporary expedient proved quite expensive, hazardous, and damaging to the equipment.

It is among the objects of the present invention to eliminate the disadvantages hereinbefore set forth.

Another object is the more effective removal of cinder from furnaces of the pan-bottom type and particularly pan-bottom open hearth furnaces using the front-flush cinder removal system.

The invention, then, comprises the features hereinafter described and as particularly pointed out in the claims, the following description and the annexed drawings setting forth in detail certain illustrative embodiments of the invention, these being indicative of several of the number of ways in which the principles of the invention may be employed.

In said drawings:

Figures 4 and 5 are elevational views, the same being taken on the line IV—IV, and V—V respectively of Figure 1.

Figure 1:
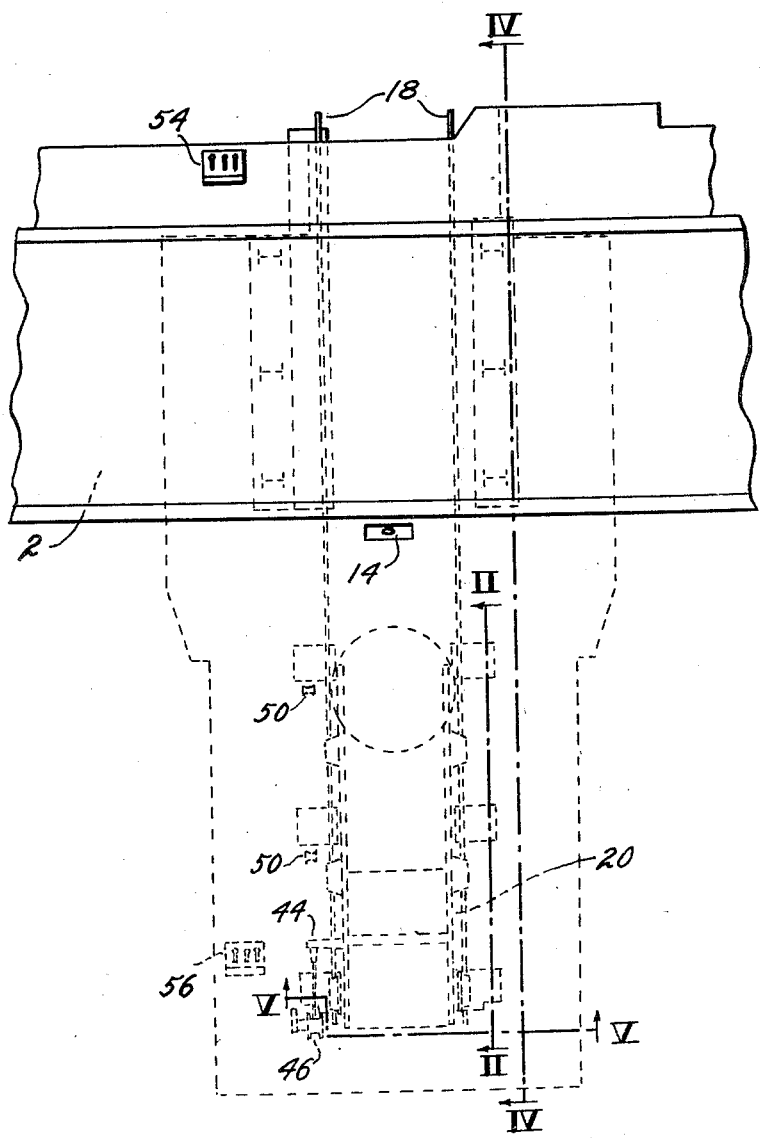
Figure 1 is a schematic plan of an open hearth furnace illustrating the general arrangement of the tunnel therebelow and the carriage of the present invention in dotted lines.
Figure 2:
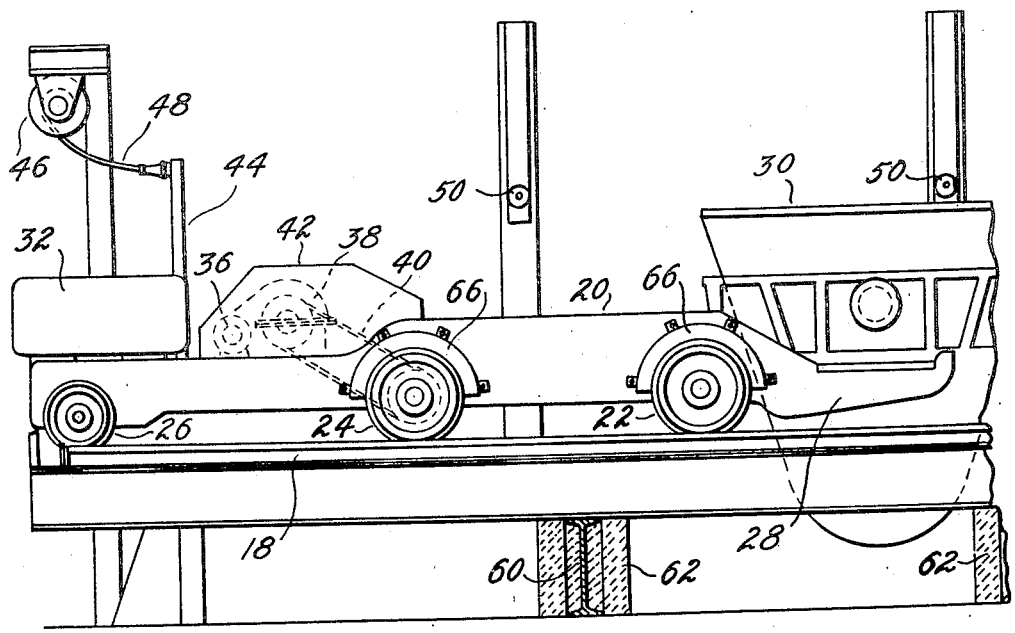
Figure 2 is a side elevation illustrating the carriage and its associated instrumentalities, being taken on the line II—II of Figure 1.

Referring more particularly to the drawings, the numeral 2 designates the hearth of a conventional pan-bottom open hearth furnace, using the front-flush cinder removal system. This hearth 2 is constructed and arranged to hold the charge which later becomes the bath of molten metal. Fuel and air are admitted to the open hearth over the charge on the hearth 2 by means of ports 4 and burners 6 respectively; and the furnace comprises the usual regenerative chambers, containing checker-brick for storing up heat from the products of combustion and imparting it to the fuel and air. Flues and uptakes connect the checker chambers with the furnace proper and at the base of the uptakes are located the slag pockets. A taphole 10 is provided for dispensing molten steel from the bath on the hearth 2, while the cinder product is tapped through a cinder hole 12 and front-flush 14.

An open hearth furnace of the type described is usually disposed with its hearth somewhat below the level of the charging floor while underneath the furnace there is a wide passageway of substantial height which is known as the lower level.

According to the teachings of the present invention there is provided underneath a furnace of the type described, and within the "lower level" referred to, a pair of tracks 18 of substantially wide gauge (for example around 11 feet) and disposed at a substantial elevation above the finish grade of the lower elevel (for example 5.5 feet). The pit between the substantially elevated tracks 18 is enclosed by brick walls and it is preferably wide enough and high enough to permit passage of a bulldozer for facilitating cleaning-out operations.

Mounted for movement along the substantially elevated wide-gauge tracks 18 is an elongate carriage 20 which is very heavily and sturdily constructed to permit it to carry heavy loads. This elongate carriage 20 is supported by three aligned pairs of wheels which are provided with suitable axles, bearings, etc., the front wheels being designated 22, the intermediate pair of wheels at 24 and the rear wheels at 26. The front end of the elongate carriage 20 is most adjacent the cinder hole 12 and front-flush 14, and it is provided with a pair of longitudinally extending parallel arms 28 which project beyond the carriage in overhanging relationship. These projecting or overhanging arms 28 are constructed and arranged to hold and support a conventional cinder pot 30, and the adjacent portion of the carriage 20 is provided with a substantial opening or aperture 31; thus any overflow of the molten cinder contained in the cinder pot will run down to the ground without spilling over the car, wheels, axles, bearings, etc.

The weight of the cinder pot 30 on the overhanging arms 28 is very substantial even when it is empty and compensation is made therefor by means of a counterweight 32 which is disposed over the rearward pair of supporting wheels 26. The cinder pot when full may weigh approximately 70 tons and when empty approximately 30 tons, and proper equilibrium must be maintained whether it is full, empty, or removed from the carriage.

One of the salient features of the present invention is the provision of a state of equilibrium such that when the cinder pot 30 is disposed on the overhanging arms 28 of the carriage 20 the center of gravity lies between the wheels 22 and 24, whereby the first four wheels and axles carry the load while the rear pair of wheels 26 and their axle is substantially floating (i. e. carrying no appreciable load); and when the cinder pot is removed from the overhanging arms the center of gravity lies between the wheels 26 and 24, and most adjacent the latter, whereby the last four wheels and axles carry the load while the forward pair of wheels 22 and their axle substantially float.

In addition to the weight distribution set forth, the foregoing construction and arrangement of the pairs of wheels 22, 24, and 26, and their respective axle units, enables the utilization of a very effective driving mechanism as will appear hereinafter.

Figure 3:
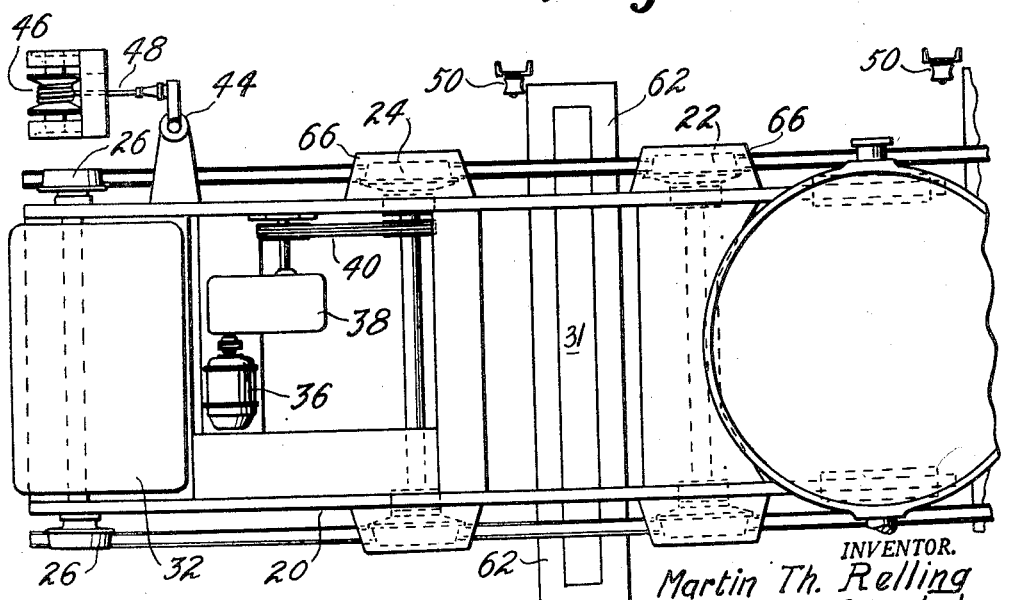
Figure 3 is a plan of the showing of Figure 2.

As shown most clearly in Figure 3, the elongate carriage 20 is driven through the intermediate, or center, pair of wheels 24. The driving of these wheels 24 is accomplished through a driving unit which is disposed on the carriage 20 slightly rearward of the intermediate wheels 24. More specifically, the driving unit comprises an electric motor 36 which is coupled to a speed reducer 38, the latter driving the axle associated with the intermediate wheels 24 through the medium of a heavy roller chain 40. This construction and arrangement is very effective and it provides an additional advantage by reason of the fact that should a substantial obstacle obstruct movement of the carriage 20, the intermediate wheels 24 will slowly spin on the tracks 18 and thus serve as a slip coupling. The entire driving unit (including the electric motor 36, speed reducer 38, and roller chain 40 and their associated instrumentalities) is protected against flying cinder particles, sparks and abrasive dust by means of an over-all cover generally designated at 42 which, because of its disposition, is itself in no danger from radiating heat or from direct spillage of the molten cinder from either the open hearth furnace or the cinder pot 30.

A vertical power mast 44 is secured to the heavy frame of the carriage 20 at one side thereof. Mounted adjacent the tracks 18 at a sufficient height above the lower level of the open hearth for efficient cooperation with the power mast 44 is a cable take-up reel 46 on which there is wound a suitable flexible power transmission cable 48 (for example a rubber-covered 4-conductor cable of the type widely used for power transmission purposes).

Extending alongside the substantially elevated wide-gauge tracks 18 and in alignment with the power mast 44 and the cable take-up reel 46 is a series of cable-supporting rollers 50, the same being disposed at an elevation which is slightly lower than the connection of the cable 48 with the power mast whereby the trailing and sagging portions of the said cable will be effectively supported. Thus the cable 48 extends from the cable take-up reel 46, over the cable-supporting rollers 50 and onto the power mast 44, and through it electric power may be delivered to the electric motor 36 to thereby rotate the intermediate pair of wheels 24 of the carriage 20 in the proper direction and at appropriate times. Conventional limit switches (not shown) may be mounted on the furnace wall along the elevated tracks 18 or provided at other suitable points to prevent excessive movement of the carriage 20 in either direction.

Preferably, but not necessarily, a controller 54 is installed at the pouring side of the open hearth furnace which is opposite, but on substantially the same level with, the charging floor; and a control cabinet 56 with suitable push buttons is installed on the charging side of the furnace but on the lower level.

By appropriate manipulation and operation of the controller 54, control cabinet 56 and the hereinbefore mentioned (but not shown) conventional limit switches, the carriage 20 may be automatically spotted in front-flush position (as indicated at A in Figure 4) with the cinder pot 30 beneath the spout of the front-flush 14 by an operator at the control cabinet 56 on the charging side of the furnace on the lower level. Subsequently the carriage 20 may be moved into the drip position, as shown at B, wherein the cinder pot 30 is disposed beneath the tapping hole 10 and thence into the ladle crane pick-up position (as shown at C) or, in the alternative, it may be moved into the emergency position D, which is provided in case of a breakout of the bottom of the furnace. The control for all operating positions of the carriage 20 is preferably effected through the controller 54 so that in any event the movement of the carriage 20 may, without its being observed, be controlled entirely from the upper level.

The substructure beams, designated at 60, which support the elevated wide-gauge tracks 18, are encased in brickwork as shown at 62; and those portions of the track 18 which extend from the substructure are protected by steel splash plates 64. In addition, curved steel splash plates 66 are provided for the front and intermediate wheels 22 and 24 respectively.

Underneath the furnace itself, the power transmission cable 48, the cable-supporting rollers 50, and the limit switches disposed along the furnace wall (but not shown in the drawings) are protected from the heat by a system of metallic heat deflector plates 70 which are suspended from the steelwork underneath the furnace.

The overhung position of the cinder pot 30 with respect to the carriage 20 permits its being disposed in the drip position B without subjecting the elevated track 18 and the carriage to cinder and steel overflow or spill damage from the steel ladle during tapping of the furnace.

While we have shown and described certain specific embodiments of the present invention, it will be readily understood by those skilled in the art that we do not wish to be limited exactly thereto, since various modifications, including the substitution of other prime movers for the electric motor 36, may be made without departing from the scope of the invention as defined in the appended claims.

We claim:

1. Apparatus for transporting the dispensed contents of furnaces and the like comprising a pair of substantially elevated wide-gauge tracks disposed to extend fully underneath said furnaces, a six-wheeled carriage mounted on said tracks, a prime mover on said carriage, means connecting said prime mover with the intermediate pair of wheels of said carriage, and a pair of overhung arms on the front of said carriage, said arms being adapted to support a container, and means for counterbalancing said container.

2. Apparatus for transporting the dispensed contents of furnaces and the like comprising a pair of substantially elevated wide-gauge tracks disposed to extend fully underneath said furnaces, a six-wheeled carriage mounted on said tracks, an electric motor on said carriage, means connecting said electric motor with the intermediate pair of wheels of said carriage, and a pair of overhung arms on the front of said carriage, said arms being adapted to support a container, and means for counterbalancing said container.

3. Apparatus for transporting cinder from metallurgical furnaces and the like comprising a pair of substantially elevated wide-gauge tracks disposed to extend fully underneath said furnace from beneath the charging floor to below the tapping hole and beyond its crane pick-up position, a six-wheeled carriage mounted on said tracks, a prime mover on said carriage, means connecting said prime mover with the intermediate pair of wheels of said carriage, and a pair of overhung arms on the front of said carriage, said arms being adapted to support a cinder pot, and means for counterbalancing said cinder pot.

4. Apparatus for transporting cinder from metallurgical furnaces and the like comprising a pair of substantially elevated wide-gauge tracks disposed to extend fully underneath said furnace from beneath the charging floor to below the tapping hole and beyond its crane pick-up position, a six-wheeled carriage mounted on said tracks, an electric motor on said carriage, means connecting said electric motor with the intermediate pair of wheels of said carriage, and a pair of overhung arms on the front of said carriage, said arms being adapted to support a cinder pot, and means for counterbalancing said cinder pot.

5. A carriage for supporting ladles comprising a frame, a pair of rear wheels, a pair of intermediate wheels, and a pair of forward wheels cooperable to support said frame, a pair of arms on said frame extending beyond said forward wheels for carrying a ladle, means rearward of said intermediate wheels for counterbalancing the weight of ladles carried by said arms, and drive means remote from said arms operatively connected with said intermediate wheels, a substantial portion of the carriage weight being borne by said intermediate wheels irrespective of whether said arms carry a ladle, thereby providing traction for propelling the carriage.

6. A carriage for supporting ladles comprising an open frame, a pair of rear wheels, a pair of intermediate wheels and a pair of forward wheels cooperable to support said frame, a pair of arms on said frame extending beyond said forward wheels for carrying a ladle, means rearward of said intermediate wheels for counterbalancing the weight of ladles carried by said arms, drive means on said frame remote from said arms operatively connected with said intermediate wheels, and means shielding said forward and intermediate wheels from material escaping the ladle.

7. A carriage for supporting ladles comprising an open frame, a pair of rear wheels, a pair of intermediate wheels, and a pair of forward wheels cooperable to support said frame, a pair of arms on said frame extending beyond said forward wheels for carrying a ladle, means rearward of said intermediate wheels for counterbalancing the weight of ladles carried by said arms, drive means on said frame remote from said arms operatively connected with said intermediate wheels, a substantial portion of the carriage weight being borne by said intermediate wheels irrespective of whether said arms carry a ladle, thereby providing traction for propelling a carriage and means shielding said forward and intermediate wheels from material escaping the ladle.

MARTIN TH. RELLING.
   THEODORE A. ZSAMBOKY.

REFERENCES CITED

The following references are of record in the file of this patent:

UNITED STATES PATENTS

| Number | Name | Date |
|---|---|---|
| 403,011 | Van Depoele | May 7, 1889 |
| 460,887 | Robbins | Oct. 6, 1891 |
| 740,405 | Dewhurst | Oct. 6, 1903 |
| 1,429,777 | Roller | Sept. 19, 1922 |
| 1,450,980 | McGregor | Apr. 10, 1923 |
| 1,633,693 | Clutts | June 28, 1927 |
| 1,783,911 | McKean | Dec. 2, 1930 |
| 1,828,762 | Brosius | Oct. 27, 1931 |

FOREIGN PATENTS

| Number | Country | Date |
|---|---|---|
| 688,338 | Germany | Feb. 17, 1940 |